United States Patent [19]
Cannizzaro

[11] Patent Number: 5,243,550
[45] Date of Patent: Sep. 7, 1993

[54] MULTI-COLUMN PRINTING CALCULATOR

[76] Inventor: Michael Cannizzaro, c/o M.D.J. Corporation, 472 Rte. 376, Hopewell Junction, N.Y. 12533

[21] Appl. No.: 989,939

[22] Filed: Dec. 10, 1992

Related U.S. Application Data

[63] Continuation of Ser. No. 859,150, Mar. 27, 1992, abandoned.

[51] Int. Cl.$^5$ ............................................. G06F 3/00
[52] U.S. Cl. .............................................. 364/710.13
[58] Field of Search ................... 364/705.01, 705.02, 364/710.05, 710.09, 710.13, 709.09

[56] References Cited

U.S. PATENT DOCUMENTS

| | | | |
|---|---|---|---|
| 3,920,979 | 11/1975 | Kilby et al. | 364/710.13 X |
| 4,635,219 | 1/1987 | Howard | 364/710.13 |
| 4,706,127 | 11/1987 | Nobuta | 358/449 |
| 4,751,668 | 6/1988 | Aihara | 364/710.09 X |
| 4,821,228 | 4/1989 | Wickes et al. | 364/710.05 X |

Primary Examiner—Jerry Smith
Assistant Examiner—Chuong D. Ngo
Attorney, Agent, or Firm—Helfgott & Karas

[57] ABSTRACT

A printing calculator is provided which can store data and print the stored data, together with the total of the data on a selected form. The calculator can store and print data in two fields for deposit slips, and can store and print data in three fields for bill, invoices, receipts, and the like. When there is more than one field of data, the calculator will total the data in a selected field. Capability is provided for sorting the data and printing according to the sort. Furthermore, displaying and editing capability is provided.

6 Claims, 7 Drawing Sheets

MULTI-COLUMN PRINTING CALCULATOR

This patent application is a continuation to the U.S. patent application Ser. No. 07/859,150 filed on Mar. 27, 1992, and now abandoned.

BACKGROUND OF THE INVENTION

This invention relates to a multi-column printing calculator, and more particularly, to a calculator which can print alphanumeric data in more than one column and add the numeric data in a selected column, thereby enabling the printing of deposit slips, bills, invoices and similar items.

In the past, various adding machines have been used to print the amounts of deposits on deposit slips and to total the deposits. However, for the most part, deposit slips are filled out manually and separately totalled on a calculator. Many bookkeepers, when filling out deposit slips, prefer to include the check numbers of checks being deposited. Some may also prefer to include other data, such as the date of each check being deposited.

In a typical 26 line item deposit slip, there is plenty of opportunity for errors and as such, wasted spaces on the deposit slip. One way to avoid errors is to use a calculator which permits displaying the deposit prior to printing on a deposit slip. In U.S. Pat. No. 4,635,219, issued Jan. 6, 1987, a printing calculator is disclosed which can be used to print deposit slips one line at a time. The calculator includes a printing mechanism and is slidable on rails to position the calculator over a desired portion of a deposit slip. The calculator prints a date and the amount of a deposit.

In order to be truly efficient, a printing calculator should permit the amount of each deposit to be entered into the calculator's memory together with identifying data, such as a check number. The amounts and identifying data should be reviewable and correctable prior to printing. Moreover, the deposit slip should be fed through the calculator automatically and, after the deposits are entered, the total deposit should be printed.

Since the basic information being entered into the calculator, i.e., amounts and identifying data, are generic to other documents, such as bill, invoices, and receipts, the calculator is preferably usable for printing such documents. In addition, the calculator should provide various features, such as single stroke re-entry, a limit to the number of entries consistent with the form being used and detection of various problems with the insertion of a form into the calculator.

SUMMARY OF THE INVENTION

Accordingly, it is an object of the present invention to provide a new and improved multi-column printing calculator.

Another object of the present invention is to provide a calculator which prints a plurality of columns of numbers and/or alphabetic characters and prints the sum total of any selected column.

Still another object of the present invention is to provide a calculator which prints bank deposit slips comprised of two columns side-by-side, one column for entries representing dollar and cents amounts, and the second column for identifying data, such as a check number, associated with each dollar entry.

A further object of the present invention is to provide a calculator which prints the total of the first column only, i.e., the dollar amount, at the appropriate place on the bank deposit slip.

A still further object of the present invention is to provide a calculator which prints bills, invoices, receipts, or monthly statements with data in distinct columns: e.g., the first column containing information on the dollar amount of each transaction of a given customer; the second column containing the number of the sale slip that recorded a transaction or the receipt number; and the third column containing the date on the sales slip or receipt.

Another object of the present invention is to provide a calculator which reprints each document, with the option of printing at each occurrence, e.g., one, two, or three columns.

Still another object of the present invention is to provide a calculator which can re-enter certain entries without requiring keying in the same information a second time.

A further object of the present invention is to provide a calculator which can detect the presence of an incorrect size form inserted at the print station.

A still further object of the present invention is to provide a calculator which can display and print the total number of items on a bank deposit slip, keep tab of the number of the line being entered, and detect when a predetermined maximum number of lines has been reached, at which time further entries will automatically be inhibited.

Another object of the present invention is to provide a calculator which can display and print three distinct fields of data, with a maximum of three fields per line.

Still another object of the present invention is to provide a calculator which can print a header, customer account number information, and date on each form or document.

An additional object of the present invention is to provide a calculator which can sort entries in accordance with pre-determined criteria, i.e., entries in any one or more of the three columns.

A further object of the present invention is to provide a calculator which can edit any line previously entered and stored in memory, so that a correct copy may be printed without re-entering all the information a second time.

A still further object of the present invention is to provide a calculator which can store in its memory all the information entered on a bank deposit slip, bill, or other document for future processing and editing, prior to printing.

Briefly, in accordance with the present invention there is provided a multi-column printing calculator which can accept forms of various widths. The calculator is capable of being set to a selected number of fields, e.g., one field for entering deposits on a deposit slip or two fields for entering the number of each check being deposited and the amount.

The calculator is provided with a display which shows the data entered in each line and editing capability for going to any line previously entered to alter the data on that line and save it for ultimate printing. In addition, a repeat function permits replicating data without re-entering the data. A sort capability is included which permits data entered to be sorted and then printed as sorted.

When the objective is to fill out a deposit slip, one or two columns are selected for either entering the amount alone on each line or the amount and check number on each line. Assuming two columns are selected, the data is entered line-by-line and, upon completion of data entry and editing, the calculator will print the data on the deposit slip and total the amount of the deposit, and also print the total.

When the objective is to prepare a bill, three fields may be chosen, e.g., one field for the date, one field for the sales slip number, and one field for the dollar amount. A header capability is included which permits the inclusion of the purchaser's name and address, account number and date. When entering and editing of the data is completed, the bill is printed with a total of the sales.

Other special features may be provided, such as form sensors to determine if a proper size form is in the calculator. In addition, the maximum number of lines to be printed may be stored so that the maximum capability of a form is not exceeded.

The aforementioned objects, features and advantages of the invention will, in part, become obvious from the following, more detailed description of the invention taken, in part, with the drawings which form an integral part, thereof.

BRIEF DESCRIPTION OF THE DRAWINGS

It is noted that the appended drawings illustrate only typical embodiments of the invention and are, therefore, not considered limiting of their scope, for the invention may admit to equally effective embodiments.

DETAILED DESCRIPTION OF THE PREFERRED EMBODIMENT

Figure 1:
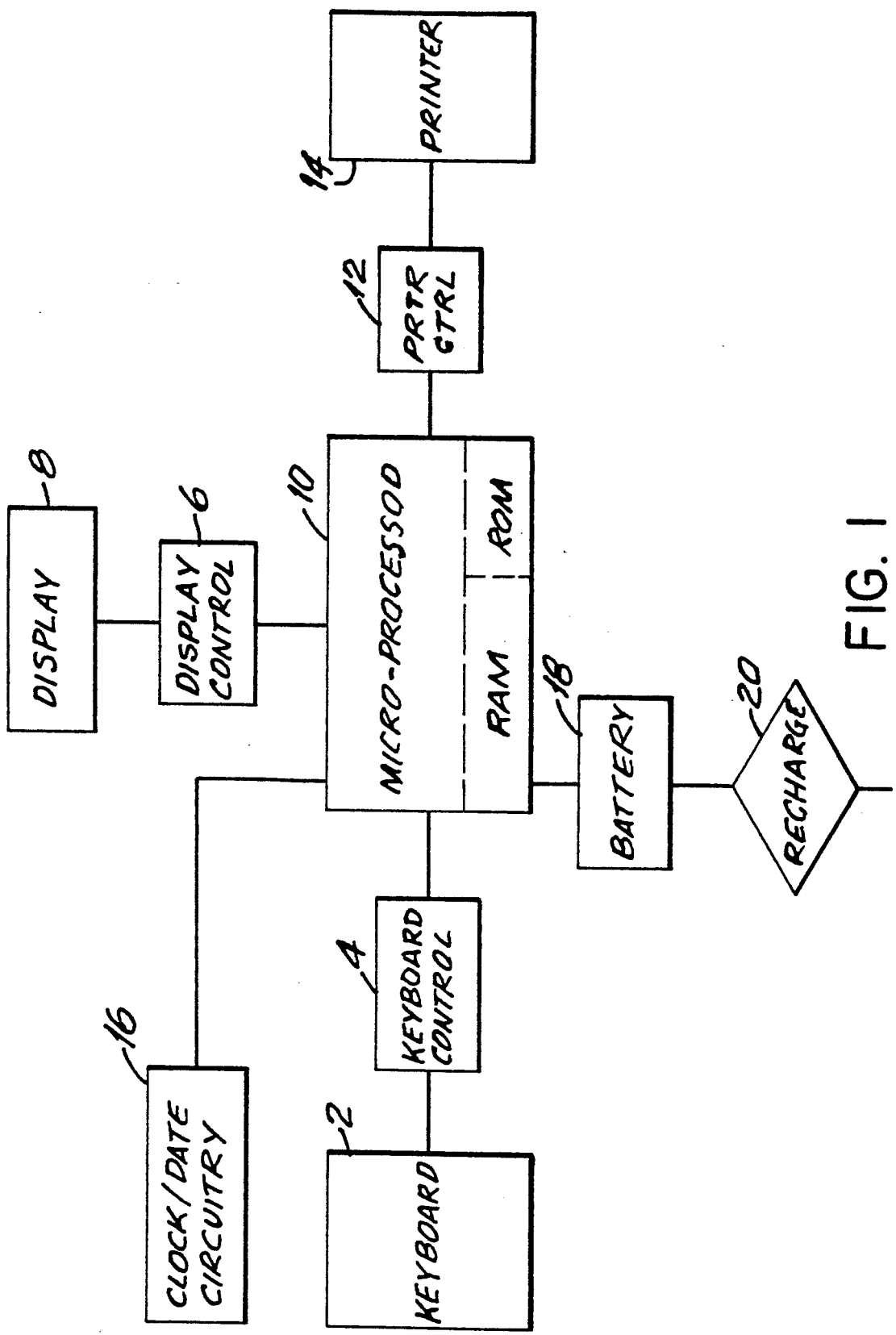
FIG. 1 is a schematic block diagram of a prior art hand calculator.

Attention is first directed to FIG. 1 of the drawings, which shows a schematic diagram of a prior art calculator. The microprocessor 10 controls all the system operations and functions of the apparatus. Moreover, it provides intelligence to the calculator and communicates with memory to fetch and store useful data. Memories routinely found in prior art calculators are a RAM and a ROM, the first for storing and fetching data, and the second to permanently store all the programs that control the operations of the calculator. RAMs and ROMs are totally independent of each other. The user interacts with microprocessor 10 via keyboard 2, which contains numerical and/or alphabetical and other special characters. Keyboard control circuitry 4 provides the necessary interface with the microprocessor. A second I/O device, display 8, is designed to display alpha-numeric characters. Most commonly used displays are electroluminescent which have the advantage of working under most lighting conditions and viewing angles. Display control circuitry 6 provides the necessary interface with microprocessor 10. The clock/day/date circuitry 16 interacts with the microprocessor, and the output thereof is displayed in display 8. An alpha-numeric printer 14 provides the necessary printing capabilities to the apparatus and communicates with the microprocessor via printer control circuitry 12. Calculators are normally powered by a battery 18, which may be recharged by a charger 20, normally plugged to a source of alternating voltage.

Figure 2:
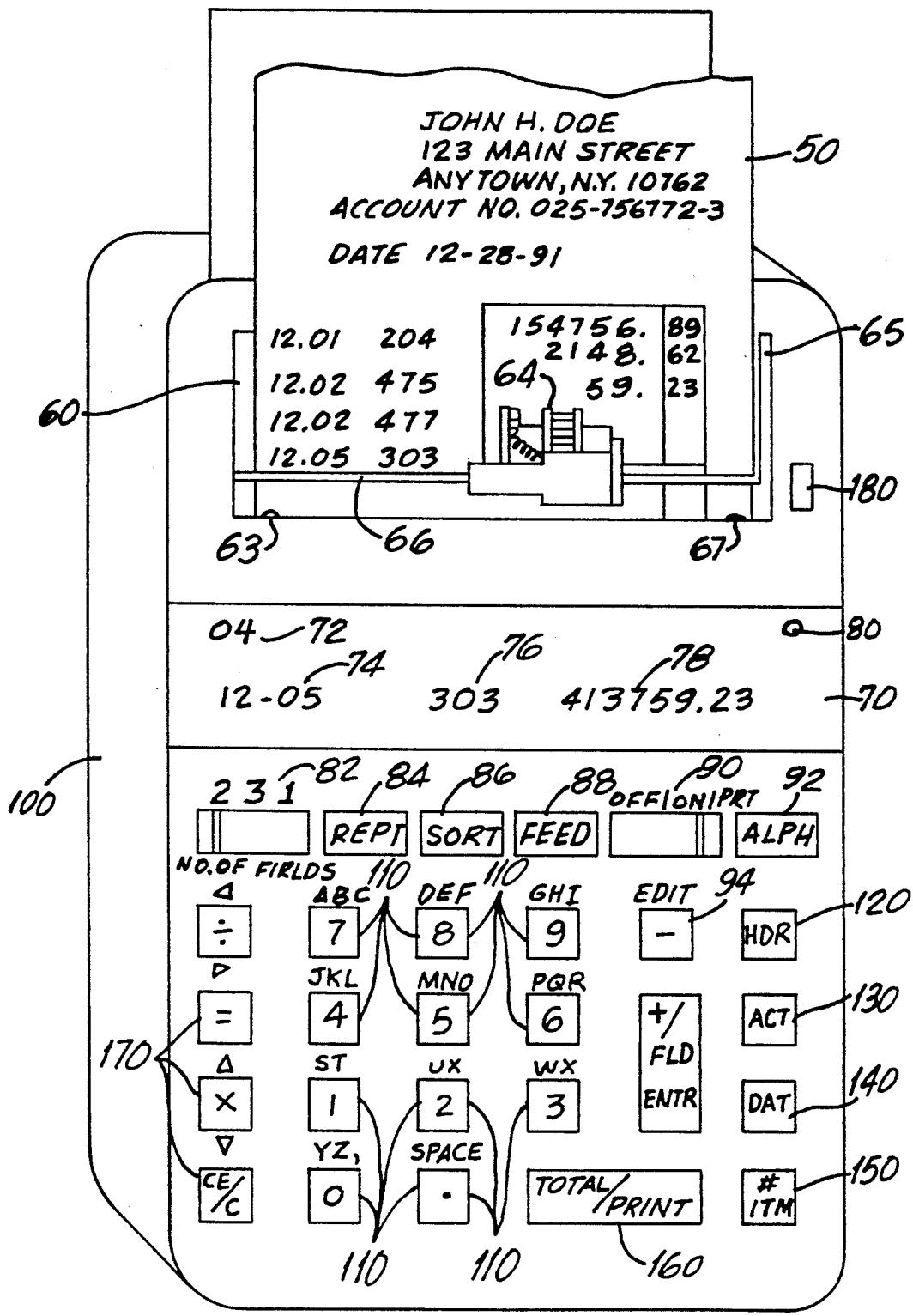
FIG. 2 is a perspective view of the apparatus, in accordance with the present invention.

Referring now to FIG. 2, a perspective view of a calculator, according to the invention, is shown. A form 50, is inserted at the printing station 60, in a manner which is standard to all calculators. Since the type of form differs from application to application, the width of the form to be inserted requires special attention. An LED (Light Emitting Diode) device 67, preferably attached to the housing of the calculator, senses the presence of a bank slip or form being inserted along a guiding rail 65. Failure to insert the form properly is detected by LED 67, and an appropriate warning is issued, either optically (by an appropriate message on the display), or by an audio signal. When three separate fields are to be printed on a line, the apparatus expects a form (such as form 50) of sufficient width to allow a readable print-out on the form. Thus, when three fields are required, a second LED (63), likewise attached to the housing of the calculator, will detect whether a form of sufficient width has been inserted by the user. By way of example, two types of forms will be described: a standard deposit slip currently used by banks to illustrate how two records are printed on two parallel columns, only one of which is to be totalled, and a bill, statement, or invoice of sufficient width for printing three separate records on three parallel columns, as shown in FIG. 2. It is evident from this discussion that if forms of greater width were available, more than 2 or 3 columns could be readily printed by the calculator. The limitations are twofold: the actual width of the form and of the printing station, and the size of the RAM within the microprocessor.

Printing is performed by a standard print head mounted on a drive mechanism. The print head is controlled by standard printer circuitry 12 (FIG. 3), normally found in any calculator with printing capabilities. Practitioners of the art will fully appreciate that a print mechanism normally consists of an ink pad and a writing extension 62 mounted on a shaft. A servo mechanism, slidably mounted on shaft 66 consists principally of a fly-wheel 64 bearing alpha-numeric characters. A drive motor travels along the shaft. Thus, the print mechanism on the shaft is first positioned to print a given character, and the print mechanism is slammed against the paper, thereby leaving the impression of the character on the paper. Many variations of printing mechanisms exist, such as one taught by Wing in U.S. Pat. No. 4,623,965, which is hereby incorporated by reference.

An electroluminescent or an LCD display 70 controlled by standard display circuitry 71 (FIG. 3), both well known to the art, displays simultaneously a plurality of fields. Shown in FIG. 2, are three fields representing, respectively, a date 74, a sales slip number 76, and a dollar amount 78. It is evident that each field can distinctly be used for a different application, such as account number, customer ID, etc. Shown at the upper top corner of the display is a number 72 to help the user keep tab how many lines he has already entered, and if need be, for editing purposes, as will be explained hereinafter.

As readily seen from FIG. 2, the enhanced keyboard is comprised of a plurality of keys that allow the calculator perform additional operations not found in standard calculators, such as repeat, edit, sort, etc. Referring now more particularly to each key of the enhanced keyboard, the tier of keys immediately below the display includes a three way switch 82 to select the number of fields desired. If a bank deposit slip is to be printed, switch 82 is set at either fields 1 or 2, depending whether or not recording of the check number is desired together with the dollar amount. If a bill or statement is to be sent to a customer, switch 82 is set at 3, thereby indicating that three fields per line will be entered.

Key REPEAT (84) serves the purpose of replicating some of the data previously entered without requiring re-entering the same information a second time. By way of example, the user may want to enter several entries having the same dollar amount, all bearing the same date.

It is oftentimes desired to sort the data entered, in accordance to some pre-determined criteria. For instance, entries may be sorted by date, by sales slip number, or by customer account number. Pressing the key SORT (86) allows sorting entries by field. Although not shown, the user has the choice of entering the number of which column or columns he would like to sort. By way of example, the user may decide to sort first in accordance to the third field, e.g., the date, to be followed by a sort in accordance to the second field, e.g., the customer's account number. Thus, upon completing this operation entries will be printed according to the customer's account number arranged in chronological order.

The key FEED (88) allows automatic feeding of a form at print station 60. The form is fed line-by-line by depressing FEED. This process continues for as long as key 88 remains depressed, and stops upon release of the key.

Key ALPHA (92) serves the purpose of switching the keyboard to alpha characters. This key allows, e.g., a header to be entered. Alphabetic and special characters are preferably embossed on the housing of the apparatus, generally with three alphabetic characters associated with each key. By way of example, if the letter "C" is to be entered, key 92 is depressed once, followed by key 7 three times. (Depressing the key 7 once, will enter the letter "A"; a second time, will enter "B"; and finally a third time, the letter "C"). By pressing the key "." corresponding to SPACE, the apparatus is ready to accept the next letter. This process is continued until the apparatus is ready to switch back to normal calculator operation, namely to numeric mode. Practitioners of the art will readily understand that this relatively tedious and cumbersome procedure can be avoided by adding a separate set of keys, each representing one letter of the alphabet or a special character, as characteristic of most standard calculators. Combining alphabetic and numeric characters into one set of keys, on the other hand, has the distinct advantage of substantially reducing the dimensions and cost of the calculator.

Editing is accomplished by pressing key EDIT (94), which allows scrolling back to the particular entry which the user wants to modify. Scrolling is achieved by successively pressing the key NO. OF ITEMS (150). Each time the key NO. OF ITEMS is pressed, the next successive line is fetched from the RAM and shown on display 70. This process continues until the line containing the data to be modified appears on the screen. Pressing the key EDIT a second time releases the keyboard which was locked during the scroll operation to avoid entering data inadvertently on a line being displayed. Corrections are entered by keying the appropriate data, and the line is returned to the RAM to precisely the same address from which the original entry was fetched. Storing data back in memory once the changes have been completed is achieved by pressing the key ENTER, as it was previously described.

The ON/OFF switch activates and deactivates the apparatus. Whenever printing is desired, the switch 90 is moved to PRINT position, thereby enabling the printer. With switch 90 in PRINT position, depressing the key TOTAL/PRINT prints the form in its totality, one line at a time, followed by an automatic release of the form until its bottom end is reached, at which time it may be retrieved by the user.

Keys 180 fulfill standard calculator arithmetic operations, and are normally used with key 82 in field position 1 (Normal microprocessor mode). Key 180 is used for manual release of the paper when the apparatus is not in operation.

Figure 3:
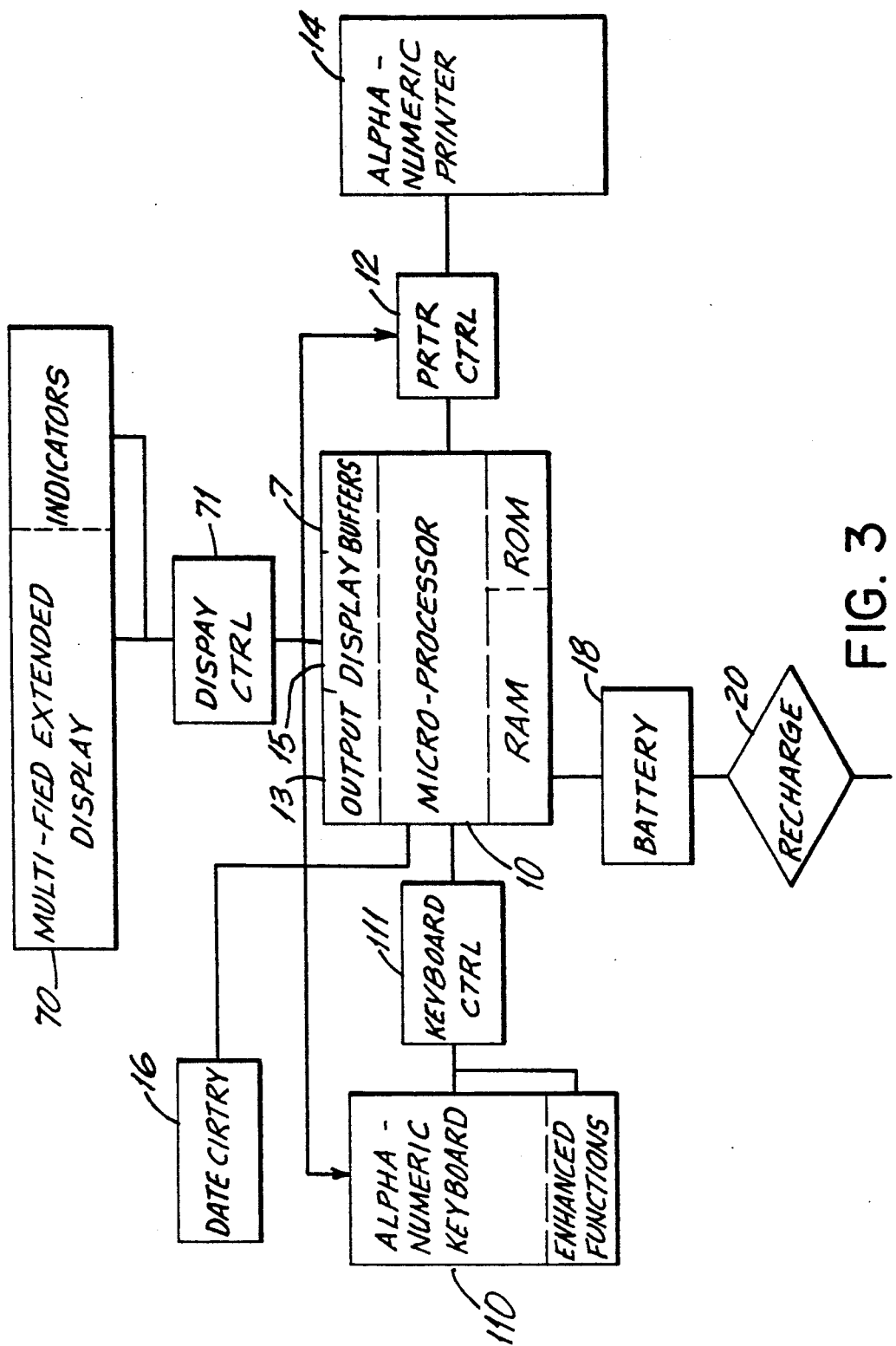
FIG. 3 is a schematic of the apparatus of the invention.

Turning now to FIG. 3, showing a schematic block diagram of the calculator in accordance of the invention, microprocessor 10, preferably a MOTOROLA 68hc05 OR AN intel 80C52 integrated chip, controls all the operations within the enhanced calculator. It interacts continuously with its RAM and ROM to fetch and store data and programs, respectively. Practitioners of the art will fully appreciate that the internal RAM within the integrated chip may be of insufficient size to perform all the operations described hereinafter. Thus, the internal RAM may be complemented by an extended memory outside of microprocessor 10. An extended display 70 capable of simultaneously displaying a plurality of fields interfaces with microprocessor 10 via display control circuitry 71. Indicator lights (such as 80 in FIG. 2) signal an incorrect insertion of paper or the presence of a wrong size form or bank deposit slip. An alpha-numeric printer interfaces with microprocessor 10 via print control circuitry 12. This circuitry is similar to that routinely found in calculators provided with printing capabilities. An enhanced keyboard 110 that includes the additional keys previously described, allows entering data in a variety of formats, in accordance with some of the main features of the present invention. The enhanced keyboard, likewise, interfaces with microprocessor 10 via standard keyboard control circuitry 111. Date circuitry 16 or, alternatively, date/day/time circuitry, provides a reading of the actual date (or date, day, and time, respectively).

Microprocessor 10 processes data in a manner similar to standard calculators. Input/output operations, however, depart from standard calculators in as much as data within each field is outputted via one of three output display buffers 13, 15 and 17, thereby maintaining total independence between the various fields. Accordingly, data corresponding to one field is not treated by microprocessor 10 in the same manner as data corresponding to another field. By way of example, only dollar amounts are regularly operated upon by the Arithmetic Logic Unit (ALU) inside the microprocessor. On the other hand, when certain operations such as sorting are required, data stored in all three output display buffers 13, 15 and 17 will be acted upon simultaneously.

Attention is turned to FIGS. 4A-4D, which flow charts the operation of the calculator. The enhanced calculator is first activated (block 300) by moving switch 90 (FIG. 2) from its OFF position to ON. Next, the number of fields is selected by the user (302) by moving switch 92 (FIG. 2) to position 1, 2 or 3. Block (304) clears all the fields in the display 70 (FIG. 2) and the RAM within the microprocessor. The word "HEADER?" is displayed next (306), prompting the user for a response. A positive answer forces branching off the main program (310) into a Header Subroutine to be described hereinafter. A negative answer to decision block (308) is followed by displaying "ACCOUNT NO.?" (312), followed by decision block (314), which prompts the user for a reply. If the user wishes to enter the requested data, he enters the Account No. (316), which is stored in the RAM (318). A negative response bypasses blocks (314) and (316), and the message "DATE?" (320) appears on the display. A position answer unlocks the keyboard and the user enters the date (324), which is then stored in memory (326). A negative answer is followed by the display of the message "NO. OF ITEMS?" (328), namely the number of checks or sales slips to be recorded. The number is entered (322) and stored in the RAM (334). A default value 26, that represents the number of entries of a standard bank deposit slip is hard coded and used when no number is entered by the user.

The main program proceeds now to execute the main loop. An index number I is initialized to 1 (336) and Total, representing the sum total of the dollar amount to 0. The following sequence of steps (338) is executed next: the first entry is keyed into the first field, and is simultaneously displayed in the appropriate portion of the display reserved for first field entries. This data is additionally stored in the RAM in the first row of an internal array inside microprocessor 10, reserved for first field entries. Finally, the entry is added to the Total. Decision block (340) interrogates whether the number of fields equal 1. If the answer is yes, the index I is incremented by 1 (352) and the system is ready for accepting the second entry of the first field. If the answer to decision block (340) is negative, the program requests that the first entry of the second field be entered, displayed and saved in the first row of a second array within the RAM, wherein all the elements of the second field are stored. Upon completion of these three steps (342), a new decision block (344) requires to be answered. Block (344) interrogates the user whether a third field is required. If the answer to this query is negative, the program branches to the next decision block (347) to determine whether the maximum number of entries N has been reached. For any count I<N, the index I is incremented by 1, and the loop is closed by returning to (338) where the same process is repeated for the incremented index I. If the answer to query (344), on the other hand, is positive, block (346) is executed, with a request for data entry corresponding to the third field, with simultaneous display of that data, and for storage in the first row of a third array within the RAM reserved for entries of the third field. Upon completion of (346), once again the program branches to (347) (Is I=N?). If not, I is incremented by 1, followed by a display of the updated I, the current line to be entered, and finally, by a branch to (338). A positive answer to decision block (348) indicates that the maximum No. of entries N has been reached, and the "Item Counter Indicator" starts flushing (350), thereby indicating to the user that no more entries are allowed since the maximum permitted has been reached, and the system automatically locks the keyboard (350). With this process completed, the system is ready for printing (351), if certain conditions to be described next, are met.

Practitioners of the art will readily appreciate that the option of printing each line as it is entered by the user is always available. Since this option is well know, no further details on it shall be provided. Moreover, the user may, at will, branch out of the main loop and stop entering further data at any time prior to reaching the maximum N.

Figure 4A:
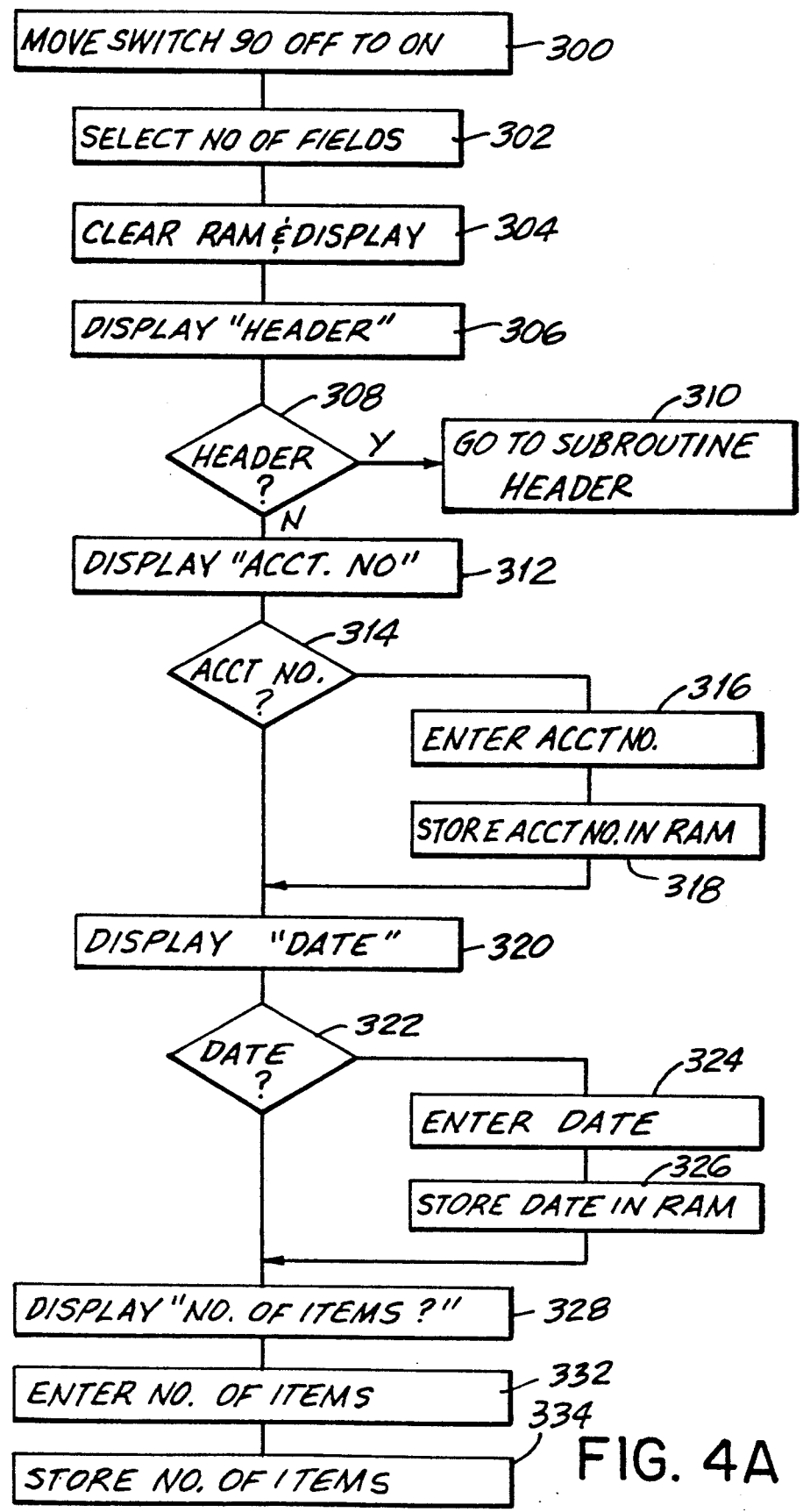
FIGS. 4A-4D are flow charts showing the sequence of steps that describe the operation of the apparatus, in accordance to the present invention.
Figure 4B:
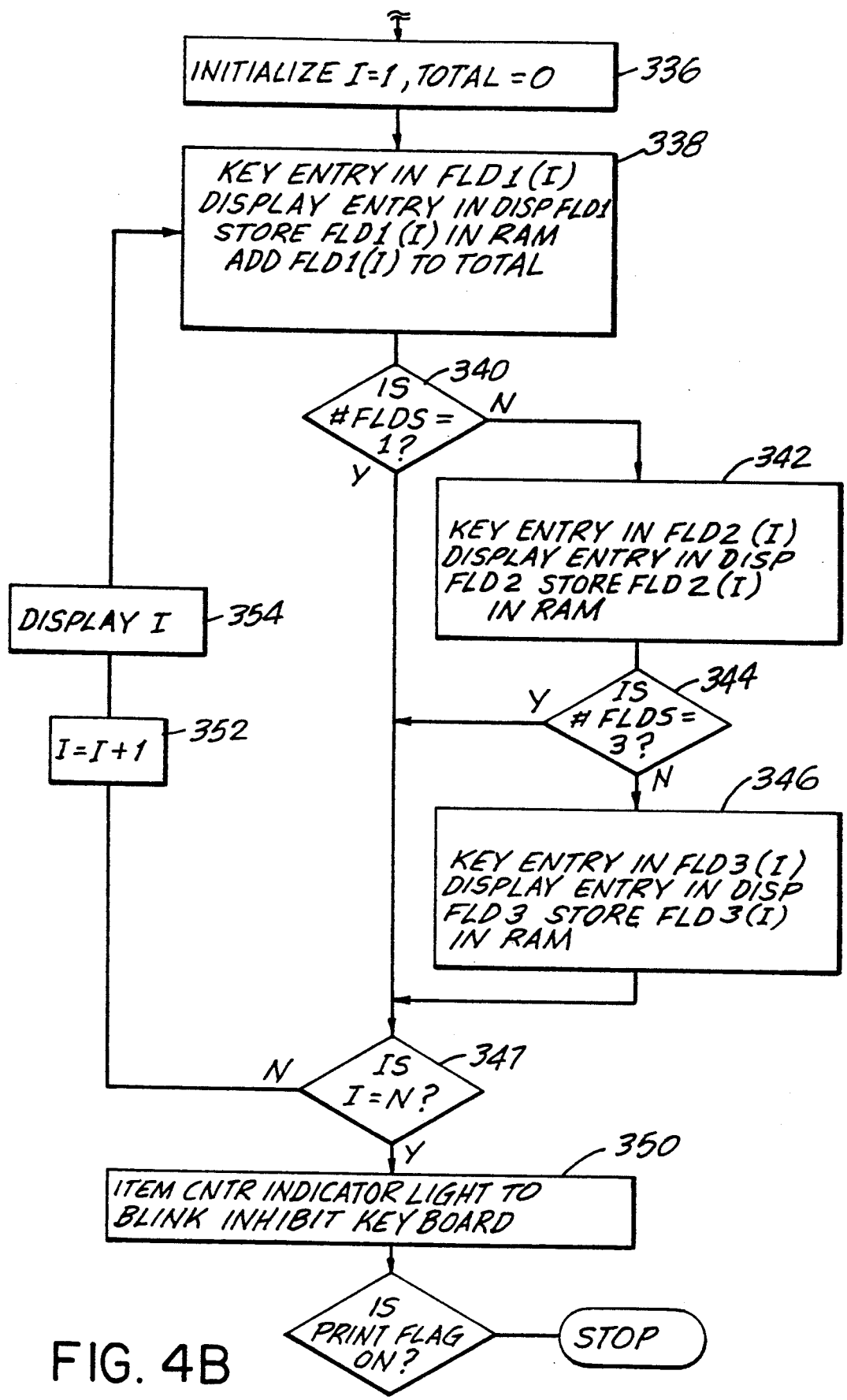
Figure 4C:
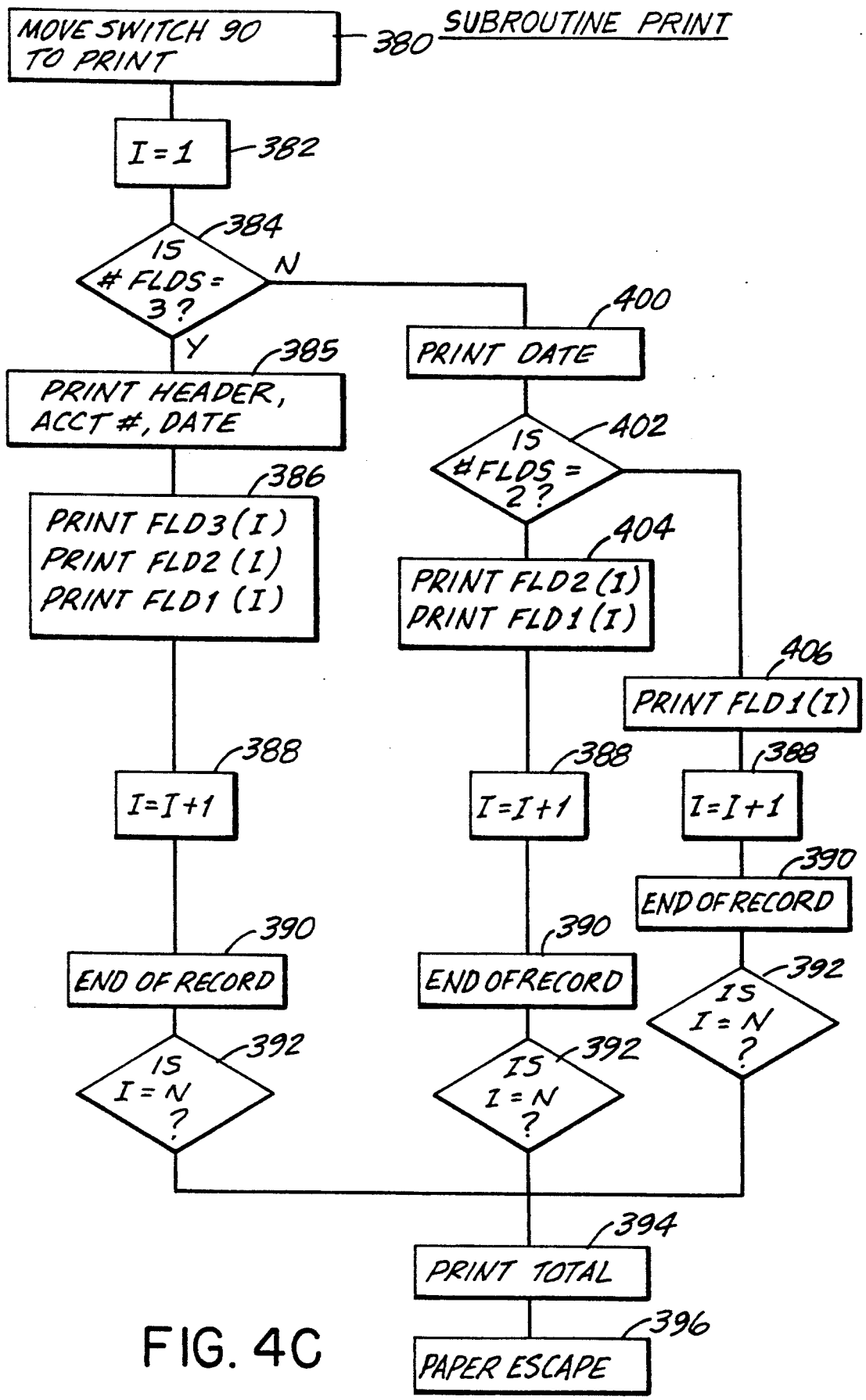

Referring now to FIG. 4C describing the SUBROUTINE PRINT, it may be recalled that one of the options open to the user was to select printing the content of the data stored in the RAM within the microprocessor. By moving the OFF/ON switch to PRINT (380), a flag is generated and stored in the RAM. Index I is once again reinitialized to 1 (382). Decision block (384) interrogates whether the No. of fields equals 3. If the answer is yes, the Header, Account No. and Date are printed. This is followed by steps (386), whereby the ith. entry of FIELD3, FIELD 2, and FIELD1, containing respectively, all the entries in memory corresponding to fields 3, 2 and 1 are stored. Index I is then incremented by 1, and an end-of-record flag is generated (390). The presence of an end-of-record flag indicates to the hardware that a carriage return is requested, thereby positioning the print head at the beginning of the third field ready for printing a new line (of three fields) and simultaneously clearing all the display fields. The system interrogates whether the maximum No. of entries N has been reached (392). A negative answer forces a branch back to (386), thereby allowing printing of the next line of three fields. This process continues until the index I=N, at which point the TOTAL dollar amount (also stored in the RAM) is printed at the appropriate place of the form (394), and the paper is automatically released to the end of the form. SUBROUTINE PRINT comes to an end, and a Return to the MAIN Program takes place.

If the answer of decision block (384) was negative, the system automatically fetches the date from Date Circuitry 16 (FIG. 3) and prints the date (400). The system queries the user to determine if the No. of fields equals 2 (402). If the answer is positive, the print head proceeds to printing FIELD2 (I) followed by FIELD1 (I). The subsequent steps (388) through (392) are similar as those described previously and will not be repeated. Similarly, if the answer to decision block (402) is negative, FIELD1 (I) is printed, index I is incremented, and if I<N, the system feeds back to step (406). The process is repeated until I=N, at which time steps (394) through (398) are executed.

Figure 4D:
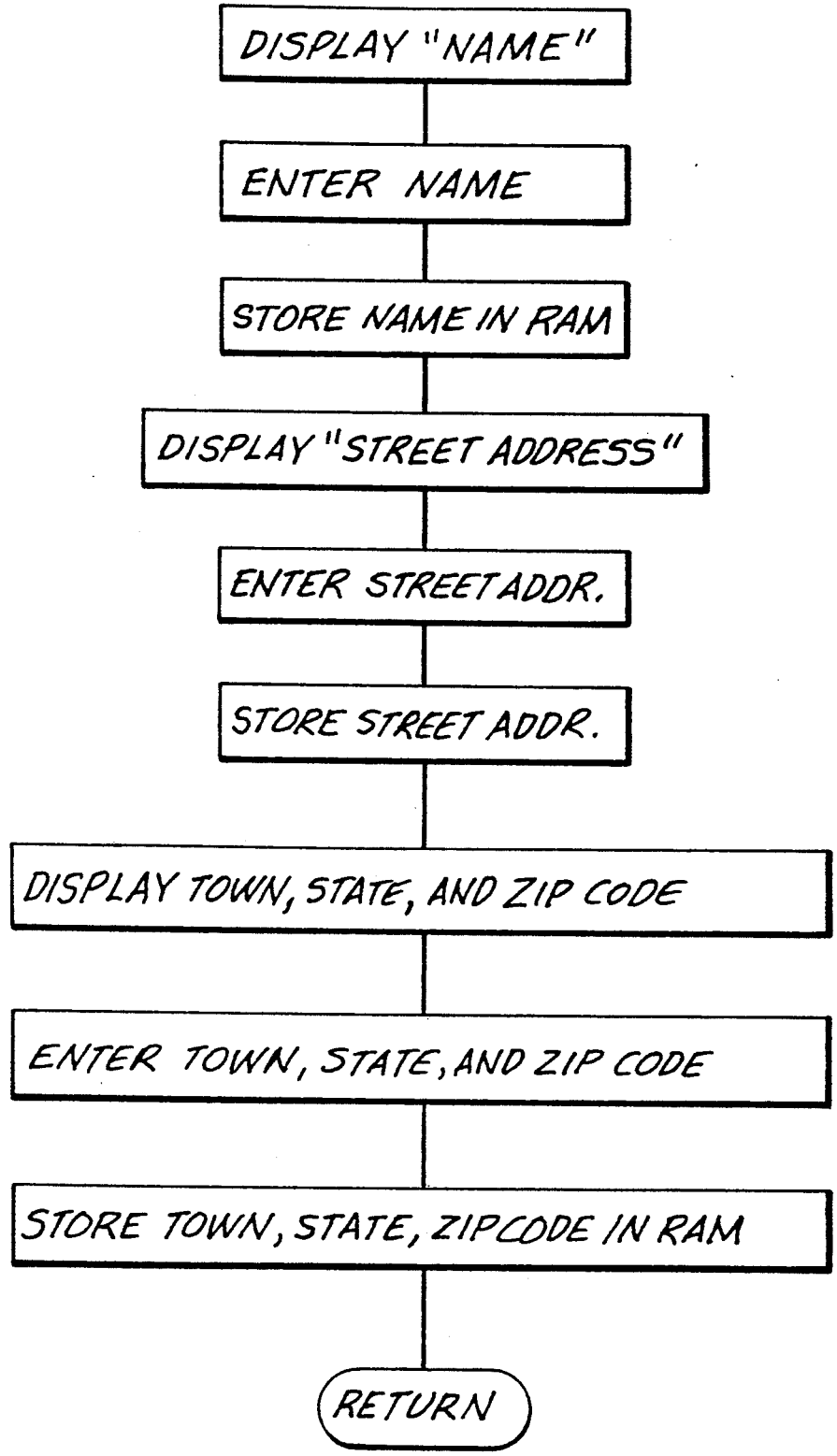

Referring now to FIG. 4D which describes the SUBROUTINE HEADER, it is recalled that forms comprising three fields may advantageously be used for bills, monthly statements, and the like. For such forms to be effective, it is important that a Header, bearing pertinent information concerning a customer be printed. SUBROUTINE HEADER is called to do exactly that. It is to be understood that the precise content and format of such forms may vary at the discretion of the user. Hence, the sequence of print messages to follow is for illustration purposes only. It is recalled from the Main Program (FIG. 4A) that the SUBROUTINE HEADER is invoked by answering YES to decision block (308). The SUBROUTINE HEADER is initiated by displaying the "NAME" of the customer. The user enters the appropriate name, which is then stored in the RAM within the microprocessor. Next, the program requests that the "STREET NAME and NO." be entered. The user responds by entering the data requested, which is displayed while the data is being entered. Next, a sequence of messages follows: such as "TOWN", "STATE", "ZIP CODE", perhaps Customer ID No., etc. This information is, likewise, stored in the RAM and displayed while it is entered. Upon completion of this operation, the program returns to MAIN.

While particular embodiments of the present invention have been shown and described, it will be obvious to those skilled in the art that changes and modifications may be made without departing from the basic concepts, thereof. For instance, it is known to practitioners of the art that many of the features previously described may be implemented either in hardware or in software. The tradeoffs associated with an implementation in hardware vs. software are too numerous to be singled out. It suffices to say, that both implementations are functionally equivalent to each other, and that the appended claims cover all such variations, changes and modifications as falling within the spirit and scope of this invention.

What is claimed is:

1. A hand-held multi-column printing calculator for printing a form of one of a bill, invoice, receipt and deposit slip, comprising:
   inputting means for entering alpha-numeric data;
   processor means coupled to said inputting means for accepting, storing and arranging said alpha-numeric data in at least two fields, wherein data in one said at least two fields is added; and
   printing means coupled to said processor means for printing side by side onthe form at least two columns, respectively, each of said columns comprising more than one row, wherein one of said at least two columns is the data to be added, and
   the other of said at least two columns is comprised of data selected from the group consisting of a date, a check number, a customer number, and a payee's identification,
   said printing means for selectively printing on the form the total of said one of at least two fields of data;
   display means for viewing inputted data;
   means for inhibiting entering more lines than can be printed on said form; and
   means for sensing a form of appropriate width to accept printing said form.

2. A hand-held printing calculator according to claim 1, which further comprises:
   an editing means which permits displaying, reviewing and editing of a previous entry, and restoring of the edited entry.

3. A hand-held calculator according to claim 1, which further comprises:
   means for replicating data previously entered without re-entering the data.

4. A hand-held printing calculator according to claim 1, which further comprises:
   means for storing and printing a header.

5. A STET calculator according to claim 1, which further comprises:
   means for sorting the data according to the information in any of the fields and arranging the data to be printed, in accordance with the sort.

6. A hand-held multi-column printing calculator as in claim 1, wherein there are three fields of data, wherein data in one of said fields is added, said printing means prints said three fields of data in three columns respectively, with each column having more than one row, one of said three columns is the data to be added, the remaining of said three columns is comprised of data respectively selected from the group consisting of a date, a check number, a customer number and a payee's identification, and said printing means selectively printing on the form the total of said one field that was added.

* * * * *